US008272010B2

(12) United States Patent
Heughebaert et al.

(10) Patent No.: US 8,272,010 B2
(45) Date of Patent: *Sep. 18, 2012

(54) TELEVISION DISPLAY DEVICE AND METHOD OF OPERATING A TELEVISION SYSTEM

(75) Inventors: Andre Julien Jacques Heughebaert, Chaumont-Gistoux (BE); Gert Josef Elisa Copejans, Aartselaar (BE); Luc Robert Marcel De Ceulaer, Dilbeek (BE)

(73) Assignee: Sony Europe Limited, Weybridge (GB)

( * ) Notice: Subject to any disclaimer, the term of this patent is extended or adjusted under 35 U.S.C. 154(b) by 0 days.

This patent is subject to a terminal disclaimer.

(21) Appl. No.: 12/969,341

(22) Filed: Dec. 15, 2010

(65) Prior Publication Data

US 2011/0085090 A1 Apr. 14, 2011

Related U.S. Application Data

(63) Continuation of application No. 11/854,904, filed on Sep. 13, 2007, now Pat. No. 7,886,320, which is a continuation of application No. 09/645,277, filed on Aug. 24, 2000, now Pat. No. 7,308,698.

(30) Foreign Application Priority Data

Aug. 26, 1999 (EP) .................................... 99306779

(51) Int. Cl.
*H04N 7/10* (2006.01)
*H04N 5/445* (2006.01)
*H04N 7/16* (2011.01)
(52) U.S. Cl. .............................. 725/37; 725/32; 725/136
(58) Field of Classification Search .................... 725/32, 725/37, 136
See application file for complete search history.

(56) References Cited

U.S. PATENT DOCUMENTS

| 4,706,121 | A | 11/1987 | Young |
| 5,583,560 | A | 12/1996 | Florin et al. |
| 5,585,866 | A | 12/1996 | Miller et al. |
| 5,589,892 | A | 12/1996 | Knee et al. |
| 5,621,458 | A | 4/1997 | Mann et al. |
| 5,648,813 | A | 7/1997 | Tanigawa et al. |
| 5,699,107 | A | 12/1997 | Lawler et al. |
| 5,801,787 | A | 9/1998 | Schein et al. |
| 6,453,471 | B1 * | 9/2002 | Klosterman ................... 725/41 |
| 6,487,543 | B1 | 11/2002 | Ozaki et al. |
| 6,560,648 | B1 * | 5/2003 | Dunn et al. ................... 709/224 |
| 6,651,251 | B1 | 11/2003 | Shoff et al. |

(Continued)

FOREIGN PATENT DOCUMENTS

EP 0 554 577 8/1993

(Continued)

*Primary Examiner* — James R Sheleheda
(74) *Attorney, Agent, or Firm* — Oblon, Spivak, McClelland, Maier & Neustadt, L.L.P.

(57) ABSTRACT

A television display system with a television display for displaying television services and internet information, and an input unit for providing a command, the television display system receiving a data stream containing a plurality of key files, each key file including executable data and a respective key image representing said executable data. The television display system includes a memory for continuously maintaining over a period at least one of the key files, a display section displaying upon occurrence of any of a number of preselected events, a key image stored in said memory, superposed on a displayed said television service, said key image upon activation executing said executable data included in the same key file. The system also includes a command section for executing content of the key file of the displayed respective image conditional upon a key command being provided by the input unit.

17 Claims, 11 Drawing Sheets

U.S. PATENT DOCUMENTS

| | | | |
|---|---|---|---|
| 7,308,698 B1 * | 12/2007 | Heughebaert et al. | 725/37 |
| 7,886,320 B2 * | 2/2011 | Heughebaert et al. | 725/37 |
| 2002/0007493 A1 * | 1/2002 | Butler et al. | 725/109 |

FOREIGN PATENT DOCUMENTS

| | | |
|---|---|---|
| EP | 757485 A2 | 2/1997 |
| EP | 0 818 925 | 1/1998 |
| EP | 0 834 798 | 4/1998 |
| EP | 0 849 948 | 6/1998 |
| JP | 11-220666 | 8/1999 |
| WO | 90 13202 | 11/1990 |
| WO | 96 17472 | 6/1996 |
| WO | 97 41690 | 11/1997 |
| WO | 97 49237 | 12/1997 |

* cited by examiner

TELEVISION DISPLAY DEVICE AND METHOD OF OPERATING A TELEVISION SYSTEM

CROSS-REFERENCE TO RELATED APPLICATIONS

This application is a continuation of and claims the benefit of priority under 35 USC 120 from U.S. application Ser. No. 11/854,904, filed Sept. 13, 2007, now U.S. Pat. No. 7,886,320, which is a continuation of 09/645,277, filed Aug 24, 2000, now U.S. Pat. No. 7,308,698, the entire contents of which are incorporated herein by reference. This application also claims the benefit of priority of 35 USC §119 from European patent Application No. 99306779.2, filed Aug. 26, 1999.

BACKGROUND OF THE INVENTION

1. Field of the Invention

The present invention relates to a television display device and a method of operating a television system, more particularly to a television display device and system using a television display for displaying television services and an input unit for providing at least one command.

2. Description of the Related Art

It is well known to receive television services and display these on a television display. Devices for receiving broadcast information and producing appropriate display information may be provided integrally with a television display or as a separate unit. In this regard, it is known to display digital television services by means of a Set Top Box in conjunction with a television display.

With the increased number of television services available, together with many other functional devices available throughout the home, users are presented with a large number of control functions. There is a problem that, with this large number of control functions, users become confused and cannot take advantage of all of the functions.

OBJECTS OF THE INVENTION

It is an object of the present invention to provide systems whereby enhanced control can be achieved, whilst providing a more straightforward interface with the user.

SUMMARY OF THE INVENTION

According to the present invention, there is provided a method of operating a receiver for receiving electronic information, the method including:
storing a plurality of alarms;
selecting an event and associating an alarm with said event;
selecting an action and associating said alarm with said action;
detecting an occurrence of said event;
upon detecting an occurrence of said event, actuating said selected alarm; and
initiating said action conditional on whether or not a control command is received.

According to the present invention, there is also provided a reception device for receiving electronic information, the device including:
a memory for storing a plurality of alarms;
an event selector for selecting an event and associating said event with a selected one of the plurality of alarms;
an action selector for selecting an action and associating said action with the selected alarm;
a detection section for detecting said event and, in response, actuating the selected alarm; and
a command section for initiating said action conditional on whether or not a control command is provided to the device when the alarm is actuated.

The reception device can be any suitable audio/visual device such as a radio, telephone, television, internet receiver, etc and the alarm can take any form such as a sound or an image. Events can include timer events, internal functions or events signified by the received electronic information.

By allowing a user to select an alarm for a particular event, the user can select an alarm which he or she feels is most appropriate. In this way, when the alarm is activated, the event will be immediately recognized.

By associating an action with an alarm, it is not necessary for the user to consider taking all of the necessary steps for that particular action. The action has been pre-associated with the alarm, such that a simple command from the user will cause that preselected action to take place.

According to the present invention, there is provided a method of operating a television system having a television service receiver, a television display for displaying television services and an input unit, the method including storing a plurality of control images;
selecting an event and associating a control image with said event;
selecting an action and associating said control image with said action;
detecting an occurrence of said event;
upon detecting an occurrence of said event, displaying for a predetermined period said control image on a portion of the television display superposed on the television service being viewed; and
initiating said action conditional on whether or not a control command is received by the television system from the user within said predetermined period.

According to the present invention, there is also provided a television display device for use with a television display for displaying television services and an input unit for providing at least one command to the television display device, the television display device including:
a memory for storing a plurality of control images;
an event selector for selecting an event and associating said event with a selected one of the plurality of control images;
an action selector for selecting an action and associating said action with the selected control image;
a display section for detecting said event and, in response, producing display information for displaying for a predetermined period the selected control image on a portion of the television display superposed on the television service being viewed; and
a command section for initiating said action conditional on whether or not a control command is provided by the input unit within said predetermined period.

In this way, a user may be warned of a pre-selected event by the appearance of a control image on the television display during the reproduction of some television service. The user might select the start of a particular television program as the event, such that, whilst watching some other television program, the appearance of the control image will warn the user that the selected television program is about to start.

By means of the invention also, the event and control image may be associated with a particular action. In this way, the user can select actions such as "change channel" or "start video recorder" so that, upon seeing the control image and depressing a single control button, the system will automatically change to the appropriate television channel or automatically start the video recorder.

By means of the present invention, the user is automatically alerted to an event and is provided with a very simple means, e.g. a single button, by which any pre-selected action may be initiated.

Preferably, a plurality of control images may be selected and associated with a plurality of respective events and actions.

In this way, the user may select a variety of different control images signifying various events, such as various television programs for viewing. Each control image and event may also have its own associated action and all actions may be initiated by means of the same single control button.

A control image need not always be associated with an action. In this case, in response to a particular event, the respective control image will merely be displayed for a predetermined period.

Hence, the control image may merely provide a warning to the user, for instance indicating that a telephone call should be made, but not requiring any automatic action within the system.

Events can include one or more of start of a pre-selected television service, start of a pre-selected category of television service, start of a desired portion of a television service, a system failure and a pre-selected time. Similarly, actions can include one or more of changing the television service being displayed, starting a video recorder and powering down the television display.

The selected action can be initiated automatically when no control command is provided within the predetermined period or, alternatively, only when the control command is provided within the predetermined period. Preferably, this is selectable by the user according to the nature of the event and the required action.

Each control image may include position data such that the display section positions the control image on the television display according to that position data. In this way, the control image may be positioned on the television display at a position appropriate for the image. For instance, an image of an aeroplane signifying the start of a travel program might be positioned at the top of the television display, whereas the image of a car, signifying a motoring program, might be positioned at the bottom of the television display.

Control images may be animated. Hence, the display section can sequentially display the individual images making up the animated control image. Furthermore, the position data may move between sequential images, such that the animated image moves across the television display.

The television display device may be for use with a broadcast stream containing a stream of key files including data representing representative key images, the television display device further including:

a memory for maintaining continuously in memory at least one of said key files; wherein the display section, when displaying the selected control image, simultaneously displays the key image of one of the data files currently stored superposed on the television service being viewed;

the command section executes the content of the key file of the displayed respective key image conditional on a key command being provided by the input unit within said predetermined period.

In this regard, the present application also provides a television display device for use with a television display for displaying television services, an input unit for providing at least one command to the television display device and a broadcast stream containing a stream of key files including data representing respective key images, the television display device including:

a memory for maintaining continuously in memory at least one of the key files;

a display section for displaying, on occurrence of any of a number of preselected events, the key image of one of the key files currently stored superposed on the television service being viewed; and a command section for executing the content of the key file of the displayed respective key image conditional on a key command being provided by the input unit within a predetermined period.

Similarly the present application provides a method of operating a television system having a television service receiver, a television display for displaying television services and an input control, the television services including a broadcast stream containing a stream of key files including data representing respective key images, the method including:

maintaining continuously in memory at least one of the key files;

displaying, on occurrence of any of a number of preselected events, the key image of one of the key files currently stored superposed on the television service being viewed; and executing the content of the key file of the displayed respective key image conditional on a key command being provided by the input unit within a predetermined period.

In this way, key images may be provided superposed on the television display indicating access to some further data and that data, whatever it is, may be accessed by the user operating a single command button. The key image may be an advertiser's logo, such that operating the command button will give access to the full television advertisement.

By associating a key image with a control image, an advertisement will be made available on the television display whenever a control image appears on the display to signify a particular event. Where the events are indicated by signals provided by the service provider, funding for providing the signals will be provided by the associated advertising.

Preferably, each control image includes information for determining the position of an associated key image such that the display section positions the key image on the television display according to that information.

In this way, the control and key images are automatically arranged to interact with one another appropriately on the television display. For instance, with a control image as an aeroplane, the key image could be positioned behind the aeroplane so as to appear as a banner being dragged by the aeroplane.

Preferably, the control image specifies a locator position within the key image such that the display section positions the key image by positioning the locator position on the television display according to the information from the control image.

In this way, where a control image is intended to connect with a key image at the top of the key image, then the display section identifies a locator position at the top of the key image and then positions the key image according to this top locator position.

Preferably, the key image is an animated image and the display section reproduces the animated image.

The key image may include animation data relating to its animation and the display section can allow negotiation between a key image and the control image with which it is to be displayed so as to ensure that their animation characteristics conform.

In this way, where the relative animation characteristics, such as frame rate or cycle time, are important to the overall appearance of the key and control images, the key and control images may negotiate variations to their characteristics to ensure that they are in conformity.

Preferably, after a key file from the memory has been executed by the command section, another key file from the broadcast stream is stored. In this way, a different key file will be available next time an event occurs requiring the display of a key image. This is particularly useful where a selection of advertisements are to be displayed.

Preferably, the television display device is DVB-MHP compliant and may be embodied in a television Set Top Box or in an integrated television system including a television display.

Using a DVB-MHP compliant device allows the functions of the television display device to be implemented in Java on an MHP API.

In this way, a system can easily be adapted to operate the present invention, merely by downloading the appropriate functions as Java applications.

According to the present invention, there is also provided a broadcast system including a carousel of key files for use with the display device.

There is also provided code components that, when loaded on a DVB-MHP compliant device and executed will cause that device to operate as described above.

There is also provided code components that define one or more control images as described above.

DETAILED DESCRIPTION OF THE PREFERRED EMBODIMENTS

The present invention will be more clearly understood from the following description, given by way of example only, with reference to the accompanying drawings.

Figure 1:
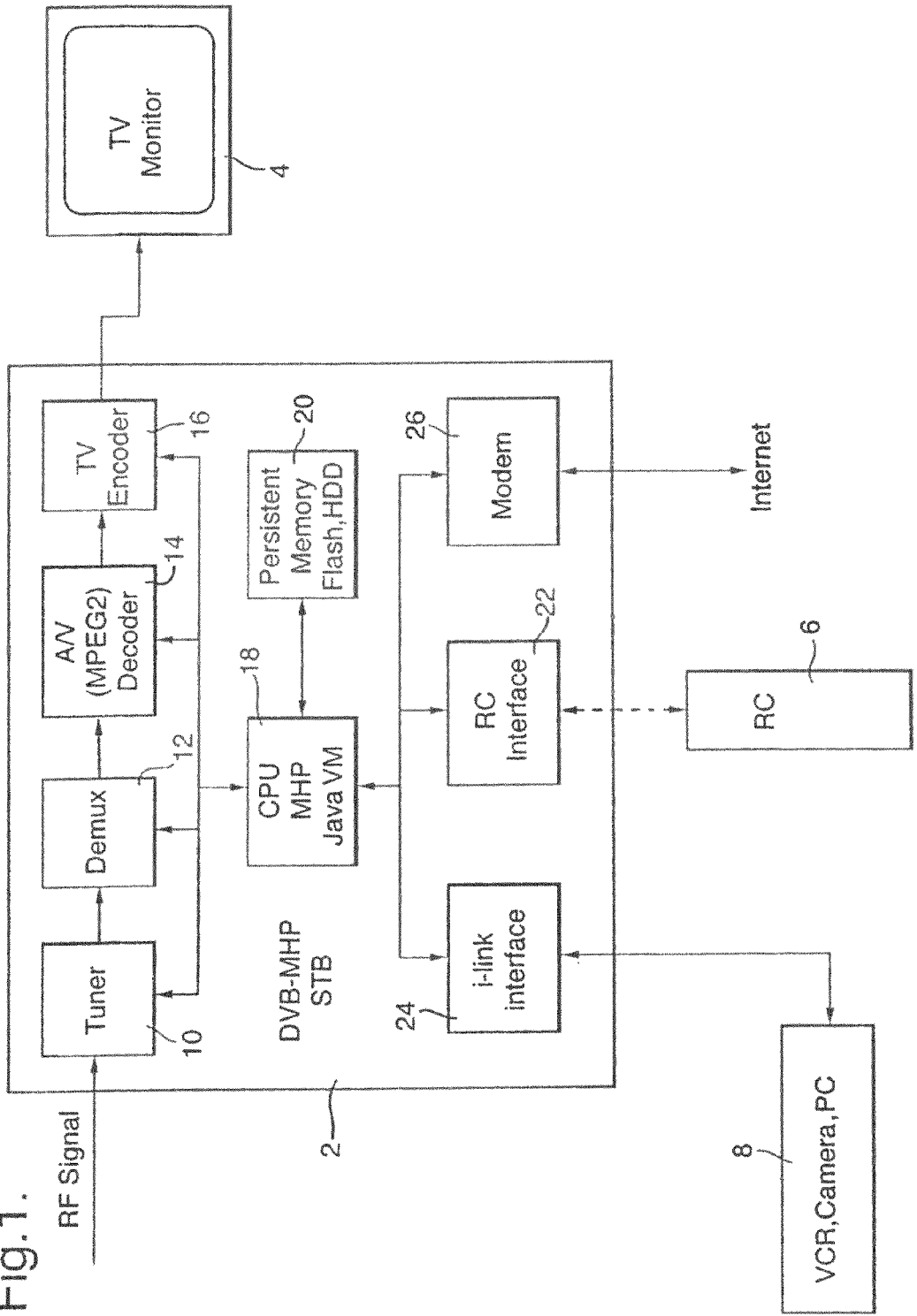
FIG. 1 illustrates a system which can embody the present invention.

The present invention may be embodied in an integrated television system in which the television display and all of the various functional units are provided in a single housing. It may also be embodied in a system in which functional components are distributed between different units. However, in the embodiment, illustrated in FIG. 1, the present invention is embodied in a Set Top Box 2 for use with a television display 4. Control is provided by means of a input unit 6 which is preferably a remote control hand set.

As illustrated, the Set Top Box 2 includes a tuner 8 for receiving an RF signal and converting it to a digital bit stream. The present invention may be used with RF signals received by any means, such as terrestrial, cable and satellite. The nature of the tuner 8 will be dependent on the RF signal that needs to be received and, typically, a different component is required for each transmission technology. The digital information stream coming from the tuner 8 is passed to a demultiplexer 12 which splits the different wanted and unwanted components. The required audio and video components are passed to the AV decoder 14 which takes the relevant MPEG comprised AV bit streams from the demultiplexer 12 and decompresses them to (higher bandwidth) TV signals. Finally, the TV encoder 16 produces a signal appropriate for reception by a traditional interlaced TV or monitor.

A controller or CPU 18 is provided to control the tuner 10, demultiplexer 12, A/V MPEG decoder 14 and TV encoder 16. Furthermore, operating together with the TV encoder 16 at least, it forms a display section and command section allowing signals to be inserted into the TV signals in order that images may be superposed on the received TV images. In particular, the TV encoder 16 may receive the raw decoded video information from the A/V decoder 14, together with additional audio and video information from the controller 18 and blend the incoming signals together.

The controller 18 is preferably composed of a CPU, RAM and a Java DVB-MIS' VM (DVB Multimedia Home Platform Virtual Machine). The Java DVB-MHP VM represents an abstraction layer to the hardware and allows a program that is created on a Java compliant machine to be executed on Set Top Boxes of different makes.

The illustrated Set Top Box also includes a persistent or back-up memory 20. In most cases, this will be a flash memory, a kind of semiconductor memory which can be programmed and which will retain its contents even if the Set Top Box is not supplied with any power. Other kinds of persistent memory may be RAM with battery back-up or a hard disk drive. This memory merely provides a back-up of any data entered into the system.

The control 18 is connected to a remote control interface 22 for interfacing with the input unit 6 and for receiving control commands therefrom.

In the illustrated embodiment, an i-Link interface 24 is provided. This is a high speed bus which is sometimes also referred to as IEEE 1394 or FireWire (Apple). It may be used to interconnect peripheral devices, such as other video/audio or computer devices.

A modem 26 may also be provided in order to link the controller 18 to a network, such as the Internet. This allows the Set Top Box 2 to receive information other than in the broadcast stream. Furthermore, it provides the Set Top Box with a return channel allowing, for instance, voting and collaborative game applications.

Figure 2:
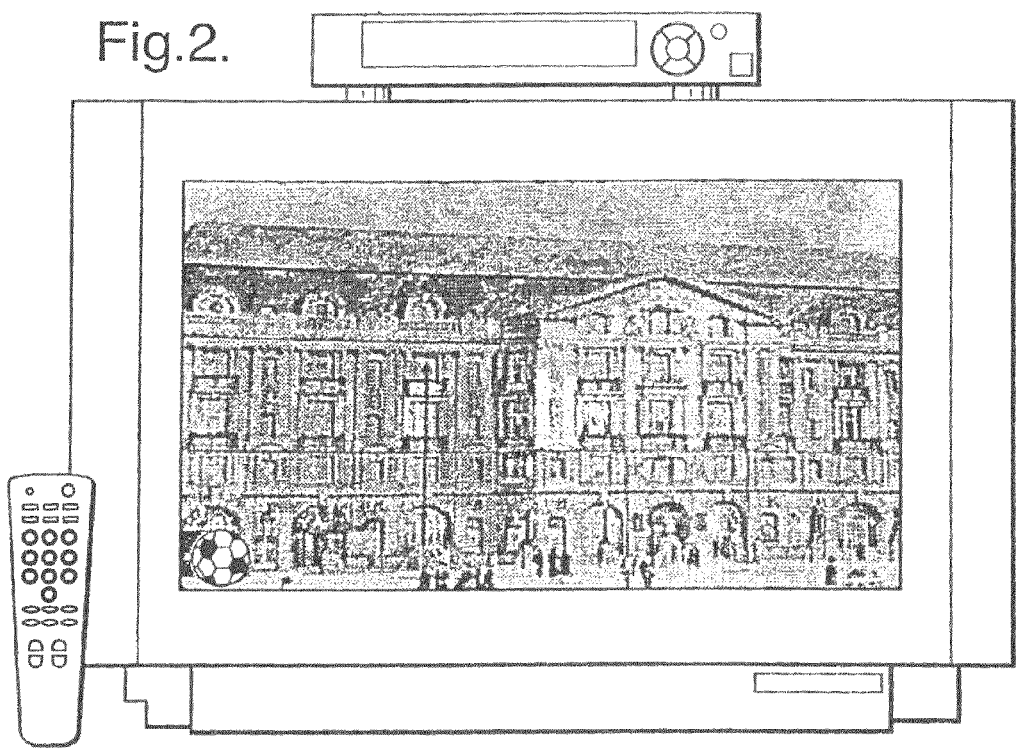
FIG. 2 illustrates a control image on a display.

During normal use of the Set Top Box 2, a selected television service, such as a particular television program, is displayed on the television display 4. In order that the user may be alerted to a particular event, it is now proposed that a control image is displayed on the television display superposed on the television service currently being viewed. This is illustrated in FIG. 2.

To produce the control image, the controller 18 provides the appropriate display information to the TV encoder 16 such that the control image appears on the television display 4.

The control image only appears for a short predetermined period, for instance of the order of 3 seconds. The control image may be a static image at one position on the television display. However, preferably, the control image is able to move around the area of the display and, preferably, the control image itself may be animated. Furthermore, the control "image" may actually include two or more images at different positions on the display. The control image may also be accompanied by sounds.

By providing a number of control images, a user can select one of the images which, in his or her view, best indicates an associated event. Thus, having selected a particular control image, when that control image appears on the television display 4, the user is reminded of the event for which he or she selected that control image. All of the various control images may be stored as control images files in the memory 20.

Control images should be large enough to be recognized immediately, but small enough not to disturb the normal program or television service. They are chosen by the user so as to have some meaning to the user so that, when a particular control image appears on the television display, it has a definite meaning to that user.

Preferably, the selection of control images can be changed. A user may acquire and/or download additional or different control images. Alternatively, the system might allow the user to create new control images. Hence, in this way, users are able to have control images which best indicate to them the associated event.

In order to provide greater interest, the control images may, as mentioned above, be animated and move about the display 4. For instance, an image of a train may move across the bottom of the display, whereas an image of a ball may bounce across the bottom of the display. Thus, the control image files include position information, which may be related to animation data, which the controller 18 uses to provide appropriate information to the TV encoder 16 so as to show the image moving over the television display 4 appropriately. The control images may also be associated with sounds appropriate for their images, i.e. the sounds of a train or a ball bouncing for the examples given above.

The control images can be associated with any desired event detectable by the controller 18. Hence, the control unit 18 might detect a preselected event indicated by a signal in the broadcast stream, over the i-Link or from the modem.

Control image may be activated by any event that can be detected by the Set Top Box. Valid events include:
1) button presses on the remote control,
2) service information events, i.e. events that are described in the DVB-SI tables, e.g. the start or ending of a program,
3) stream events as described by DVB, e.g. a change in the score over football game on another channel,
4) time events;
5) system events, e.g. warnings or failure messages like "VCR end of tape" or "i-Link communication problem".

Figure 3:
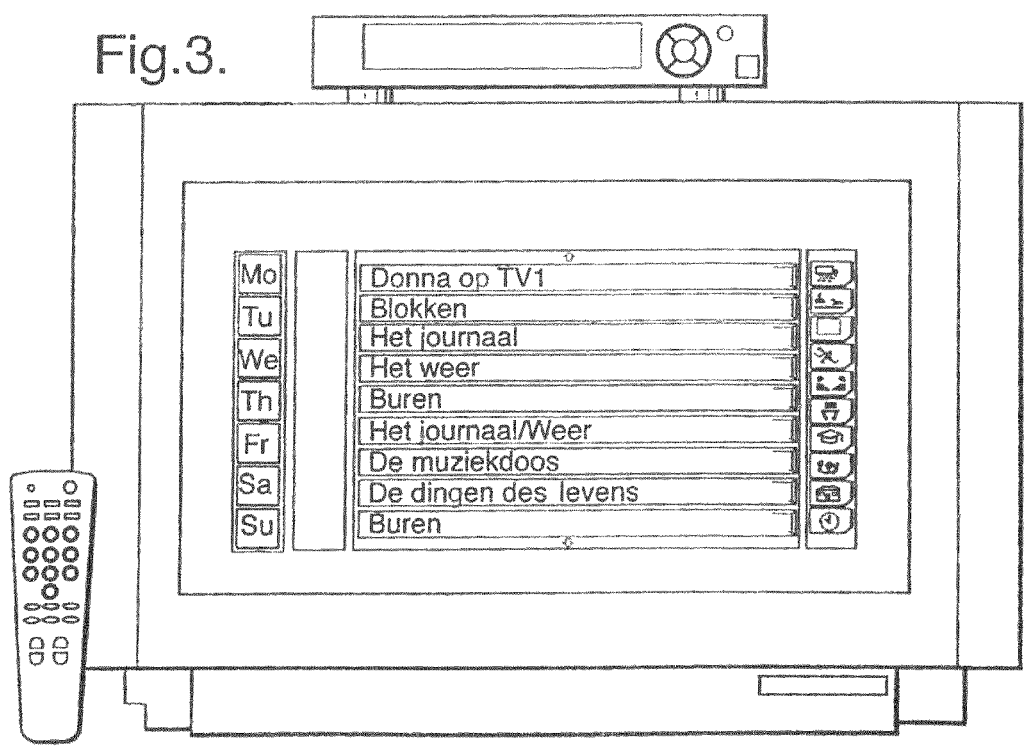
FIG. 3 illustrates selection of a program on an EPG.

According to established standards, such as DVB, television broadcast services include data indicating certain information, for instance the start times, of television programs. Furthermore, it is possible to display on the television display 4 an electronic program guide or EPG. This is illustrated in FIG. 3.

Figure 4:
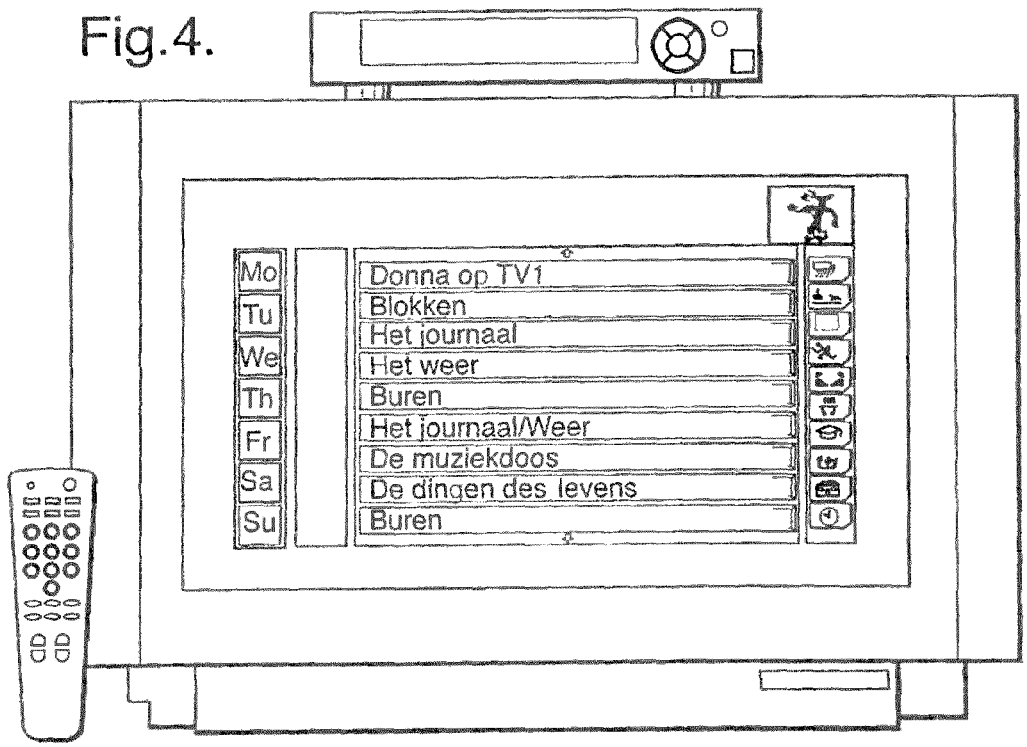
FIG. 4 illustrates selection of a control image on a display.

Having selected a particular program, starting at a particular time on a particular day on a particular channel, it is then possible to assign a control image to the event of that program starting. Preferably, having chosen a particular program and as illustrated in FIG. 4, the user is presented with a window in which he or she can scroll through the various control images stored in the memory 20. Having assigned a particular control image, at the start of the selected program, the controller 18 will cause that control image to be displayed on the television display 4. In this way, the user will be reminded of the start of the selected program.

Apart from individually assigning a control image to a particular television program, standards exist whereby programs are categorized, for instance sport, gardening, films. Therefore, a user can assign a control image an action to a particular category of television program. Similarly, it is also possible for the system itself to build up a profile of a viewer's habits, such that it produces a control image based on the type of programs in which the viewer has previously shown interest.

Figure 5:
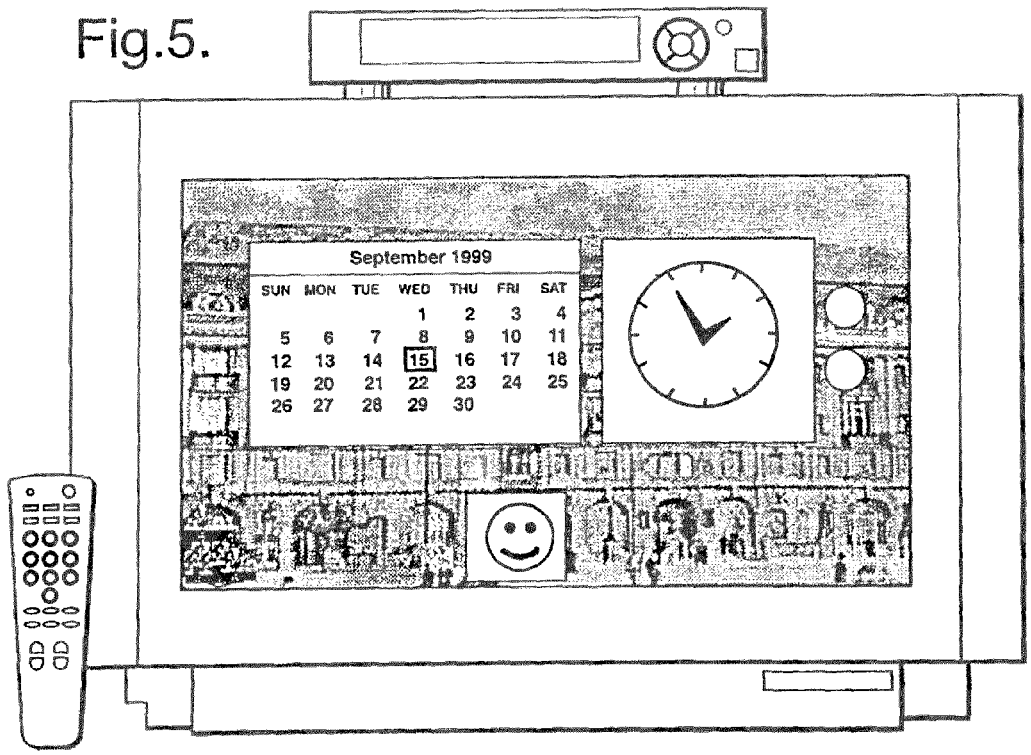
FIG. 5 illustrates selection of a control image for a particular time on a display.

It may be that the user only requires a reminder. In this respect, the event may merely be a time. For example, as illustrated by FIG. 5, the user may select a particular time at which he or she is expected to make a telephone call. This might be signified by a control image showing a telephone.

According to the present invention, however, the system also allows an action to be initiated.

Having selected a control image for association with a particular event, the system allows the user to select an associated action. In this way, appearance of a control image not only signifies a preselected event, but also signifies an action which the user might wish to initiate upon occurrence of that event. So that the user does not have to carry out the action, a single predetermined control button is provided on the input unit 6 for initiating such actions. Thus, during the predetermined period in which the control image is displayed on the television display 4 so as to signify a particular event, operation of the control button on the input unit 6 will cause the associated action to be initiated. A record of what action is associated with what event is stored by the controller 18 and memory 20 such that the user need only consider using a single control button.

Upon seeing a particular control image, the user will know that the pre-associated action will be initiated automatically upon depressing the control button of the input unit 6. The associated actions may be anything under the control of the controller 18. Thus, the control 18 could change the channel being viewed on the television display 4, could operate a video recorder or such like or could transmit signals via the modem 26. By way of example, having set an event as the start of a particular television program, the action could be to change channels to the appropriate channel for that program or to start operation of a video recorder to record that program.

It is envisaged that usually the action will not be taken unless the control button of the input unit 6 is depressed during the predetermined period in which the control image is displayed. However, it is also possible to arrange actions such that they will take place automatically unless the control button of the input unit 6 is depressed during the predetermined period in which the control image is displayed.

The control image should appear for long enough to get the attention of the viewer and for the viewer to have an opportunity to operate the control button of the input unit 6. However, it should not be so long as to disturb the normal viewing. It is possible for the system to allow the viewer to select the period for which control images should be displayed.

Another use of control images is as follows. At the end of a television program, the broadcaster may inform the audience of another program. This might be unrelated or might be the next part of the same series of programs. The broadcaster can broadcast precise information about the particular event, thereby easily allowing the viewer to associate a control image and action with that event.

In addition to displaying control images, the system may also display key images. These will be discussed below.

The broadcast services received by the Set Top Box 2 may include a carousel of key files. These key files should include key images, together with other data for execution. Typically, the other data would relate to audio/video sequences for display on the television display 4.

During use, the Set Top Box downloads at least one key file from the carousel and, under the control of the controller 18 stores it in a cache memory. In this way, whenever the Set Top Box wishes to access a key file including the key image and associated executable data, it is immediately available from the cache memory and need not be downloaded.

Events can be preselected by the user or by the broadcaster. In response to these events, for instance the start of a particular television program or the start of a replay in a sports program, the control 18 retrieves the key image from memory and passes appropriate display information to the TV encoder 16 such that the key image is displayed on the television display 4 superposed on the television service currently being viewed.

The key image may be a static image or may be animated. It may also move across the television display. It should be large enough to be recognized immediately, but small enough not to disturb the normal program. As with the control images, the key images may have associated sounds.

The key image is displayed for a predetermined period only. However, if the control 18 detects that a key command has been received from the input unit 6, it causes the key file to be executed. Typically, as mentioned above, the key file includes an audio/video sequence for display on the television display 4. Therefore, the controller 18 provides the TV encoder 18 with the appropriate information to display the audio/video sequence on the display 4. In this respect, the audio/video sequence may be encoded and, the controller 18 may also make use of the A/V decoder 14. The audio/video sequence can be displayed on only a part of the television display 4, with the current broadcast service being displayed in the remainder of the television display 4. However, preferably, the audio/video sequence replaces the current broadcast service until the end of the sequence is reached.

After a key image has been displayed, whether or not the associated file is executed, the file is deleted and a new key file downloaded from the broadcast carousel.

In this way, whenever a preselected event occurs, the controller 18 causes a key image to be displayed on the television display, thereby allowing the viewer to access the associated executable file by means of only a single control button on the input unit 6. The key images and key files are changed for each consecutive event. The selection of key files from the carousel can be random or in sequence. Alternatively, the controller 18 may build up a profile of the taste of the viewer and select key files according to that profile.

Figure 6:
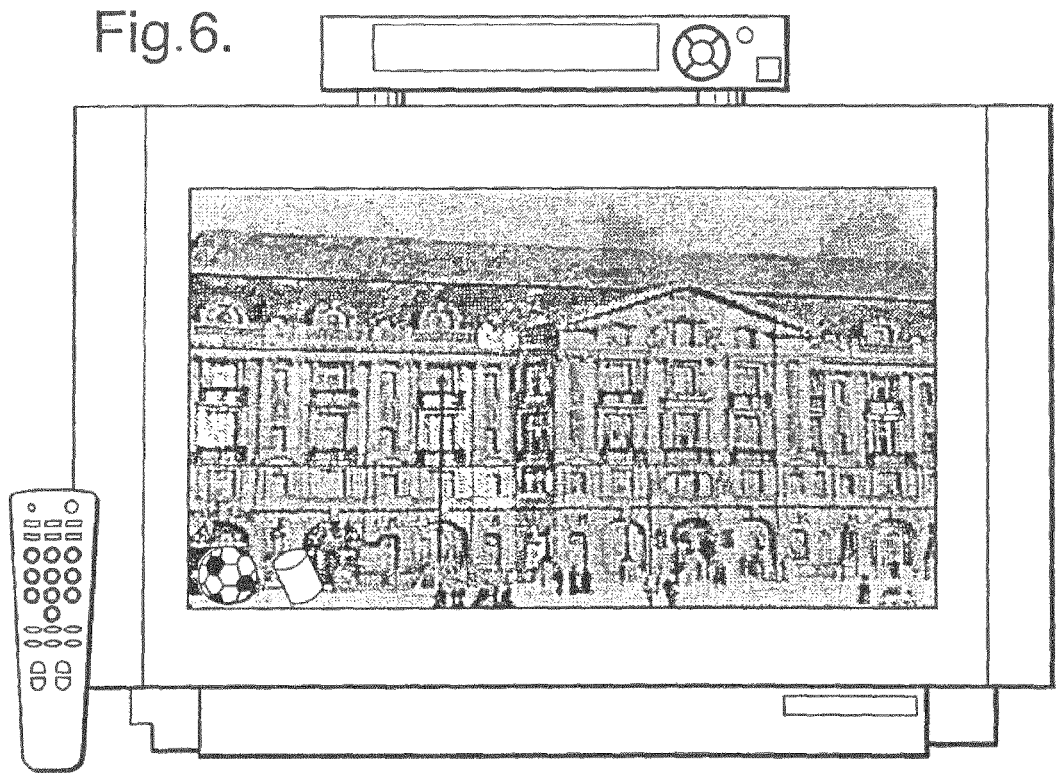
FIG. 6 illustrates a key image in conjunction with a control image.

The use of key images is particularly advantageous in conjunction with the control images discussed above. In particular, it is proposed that, whenever a control image is displayed on the television display 4 in response to a preselected event, it is displayed together with a key image. This is illustrated in FIG. 6. The control images and key images are similar in nature, for instance size. Furthermore, as is clear from the above, they may be static, moving and/or animated.

The provision of key images is particularly useful for providing television advertisements. In particular, whenever a preselected event occurs such that a preselected control image appears on the television display 4, the controller 18 will cause the key image of a key file held in cache memory to be displayed together with the control image. The key image will be some image identifying a particular advertisement or product, for instance an image of a can of a particular drinks manufacturer or the logo of a particular car manufacturer. The viewer then has to consider only two control buttons on the input unit 6. By pressing one button, the preselected action for the control image will be executed, for instance changing channels. By pressing the other button, the key file will be executed so that, for instance, the full audio/video sequence from an advertiser will be displayed on the television display 4.

Preferably, the control images and key images are arranged so as to interact in a pleasing manner.

Preferably, at least the position of the key image should be determined by the control image, in particular from positioning data in the control image file. Hence, a control image can cause the key image to be displayed adjacent to it in some way. Also, movement of the images can also be controlled by the control image. For instance, if a viewer selects an image of a canon to remind him or her of a military program, the control image of the canon could control the associated key image to move across the screen as if fired from the cannon.

In order that the relative positions of the control image and key image can be properly controlled, it is proposed that the control image should define a locator position within the key image. The locator position can be anywhere within the key image, though typically, it is most likely to be at its centre, at the centre of one of its sides or at its corners. In this way, the control image can control the position of the key image by defining the position of the locator position on the television display. Thus, for instance, where the control image is a small figure throwing an object, the locator position would be defined at the bottom of the key image so that the figure could throw and catch the key image from its bottom. In this respect, it is also possible for the locator position to be defined dynamically. In other words, the locator position may be changed during the animation in order to enhance the animation.

Where a key image is to be displayed with a control image, it may be necessary to ensure that their characteristics are similar, particularly if any form of interaction is to take place. Hence, preferably, before any display takes place, some negotiation is conducted between the control image and the key image.

Negotiations may include setting the locator position as mentioned above. They may also include comparing the number of frames in the animation cycle, comparing the total duration of the animation cycles, comparing the aspect ratio of the images, determining whether or not the animations are cyclic and comparing the image frame rate (i.e. the time between consecutive frames) for the animated images. It is also possible that the negotiations may consider the orientations of the images.

In general, where a particular aspect of a control image is not important, it may consider changing that characteristic, for instance dropping one of the frames from its total cycle. However, in general, it is considered that the control images control the key images and, therefore, the key images are modified so as to conform to the control images.

The broadcast stream may contain a number of carousels of key files. In particular, each television service or program may have an associated carousel. Thus, if a viewer has selected the start of a program on a particular channel for the event, the controller 18 will download at least one key file for that particular program. In this way, when the control image appears and grabs a key image, the key image will be appropriate to the selected event. When this is used for advertising, it means that the key image can represent an advertisement for the sponsors of the selected program. This might be of particular importance where a sports program provides broadcast data indicating the start of replays so that a viewer may be alerted to any replays whilst watching another channel. In this case, sponsors of the sports program will want their key files and key images to be presented to the viewer whenever a control image indicates that a replay is taking place in the sports program of the other channel.

It is possible for the key file carousel of the broadcast stream also to include control images. These control images could be downloaded by the Set Top Box so as to increase the selection available to the viewer.

It is proposed that the control images and key images should each take up less than approximately 5% of the surface of the television display. In some systems, it could be arranged that the user can choose the size of the control images. However, preferably, the key images should then automatically be adjusted to have a corresponding size.

New key images are broadcast at a frequency that depends on the current programs, the available bandwidth and the time of day. This may vary, for example, between 1 and 20 per minute.

When a control image selects a key image or at least when the control 18 downloads key images, the choice of key images may be based on a combination of a viewer's profile, the current channel and a control images choice.

The viewer's profile may be built up by the controller 18 by monitoring the channels tuned to by the viewer, the key images opened by the viewer and any Java applications launched by the viewer. The controller 18 could also maintain different profiles linked to different viewers, e.g. members of the family. However, in this case, the individual viewer would have to identify himself.

The choice can be made on the basis of the current channel, since some key images may fit better to the current program than others.

It is preferred that any key image will be associated with any control image. However, since some combinations may look better than others, it is possible for the system to allow key images to be chosen partly at the preference of the control image.

The combination of control image and key image appears on the screen for a short time. Control images, together with the key images, disappear after a few seconds (typically between 1 and 5). This duration may be configured by the viewer. During this period, the viewer may interact with it using the input unit or remote control device 6. As explained above, there are at least two valid interactions, each of them being triggered by a dedicated button on the remote control.

For example, a green button may instruct the control image to execute an associated action. To each event or event type, the viewer may have associated a single action. If so, the remote control's green button will trigger this action. Valid actions might include an instruction to the TV set or Set Top Box for instance to tune to a given service, to a video channel or Java application or to power off or mute the TV set. Other actions might include instructions to any device that is connected over the I-Link, e.g. if the event is the start on another channel of a program the viewer is interested in, the action may be to start recording that program. Other actions might include the registration of a future event to be notified. If, for example, the event that triggered the control action is a message from the broadcaster indicating that the current program stops and will be resumed next week at the same time, the action could be to ask for a control image to notify the viewer when that program resumes. That new control image will have an associated action to tune to the corresponding channel.

The second dedicated button may be a red button for "opening" the key image. When the viewer presses the red button while a control image and key image are on the screen, the associated file may be executed. It may use all of the Set Top Box resources, e.g. to tune to a commercial (short video/audio), start some animation (possibly full screen) or user return channel to notify the advertiser that the viewer is interested in his advertisement.

It is also possible to provide a third button, for instance an "info" button. The info button instructs the control image to display a message on the screen. This message explains the meaning of the control image's appearance. Although this interaction is possible whenever a control image appears on the screen, the viewer would only occasionally use this possibility, because, with most of the control images, he would remember the associated event and would not need any additional information. Preferably, if information is displayed on the screen, the viewer can remove it by pressing the info button a second time.

The system as described above, can be installed permanently into a Set Top Box. However, it is also applicable to any DVB-MHP compliant device. Thus, the necessary system may be downloaded as a series of applications, such as Java applications. Thus, the controller 18 operates as a Java virtual machine. The DVB-MHP (Digital Video Broadcast-Multimedia Home Platform) provides a standard abstraction API for Set Top Boxes.

Both the control images and the key images are then implemented as Java objects. Each of them can then implement an interface that is used to synchronize location, size and speed of animation.

The viewer may associate the control image of his choice to particular events with the help of different Java applications. Although different Java applications may allow the viewer to subscribe to the same events or event types, at least a following range of applications are considered:

1) set up and configuration applications; these applications allow the viewer to configure the TV's resources (tuner, contrast, etc). They also allow him to set up preferences about events and control images; the viewer can enable or disable the notification of some event types (e.g. system events) and associate control images of his or her choice, 2) clock/alarm applications; these applications allow the viewer to set an alarm to single time points (e.g. on the 17 October at 20.00) or recurring time points (e.g. every Friday at 22.25), 3) electronic program guides (E.P.G.), 4) event notifications (control image appearances); the action associated to a control image may be to be a subscription to another event.

Figure 7:
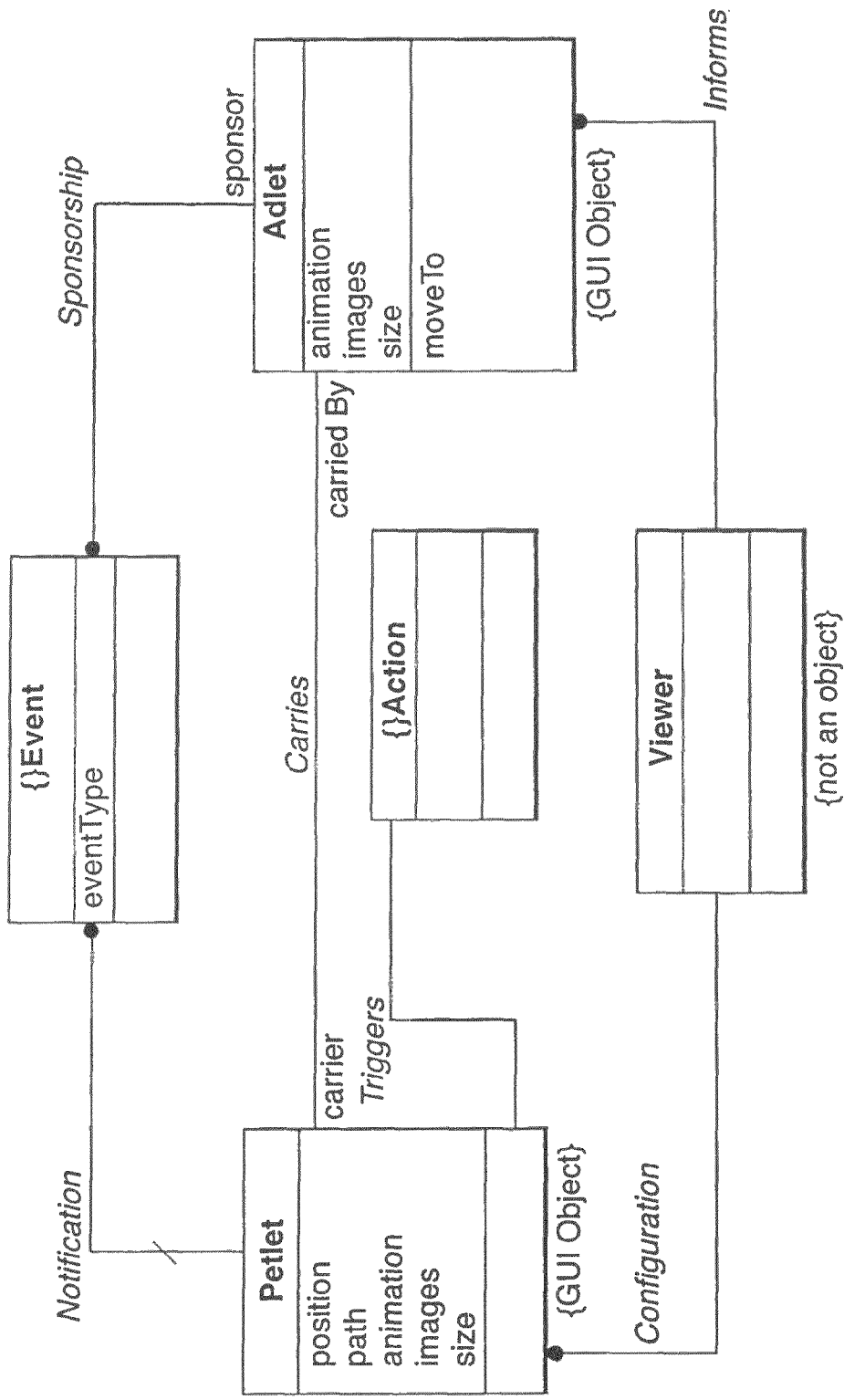
FIGS. 7 to 13 illustrate UML diagrams of various objects which may embody the present invention.
Figure 8:
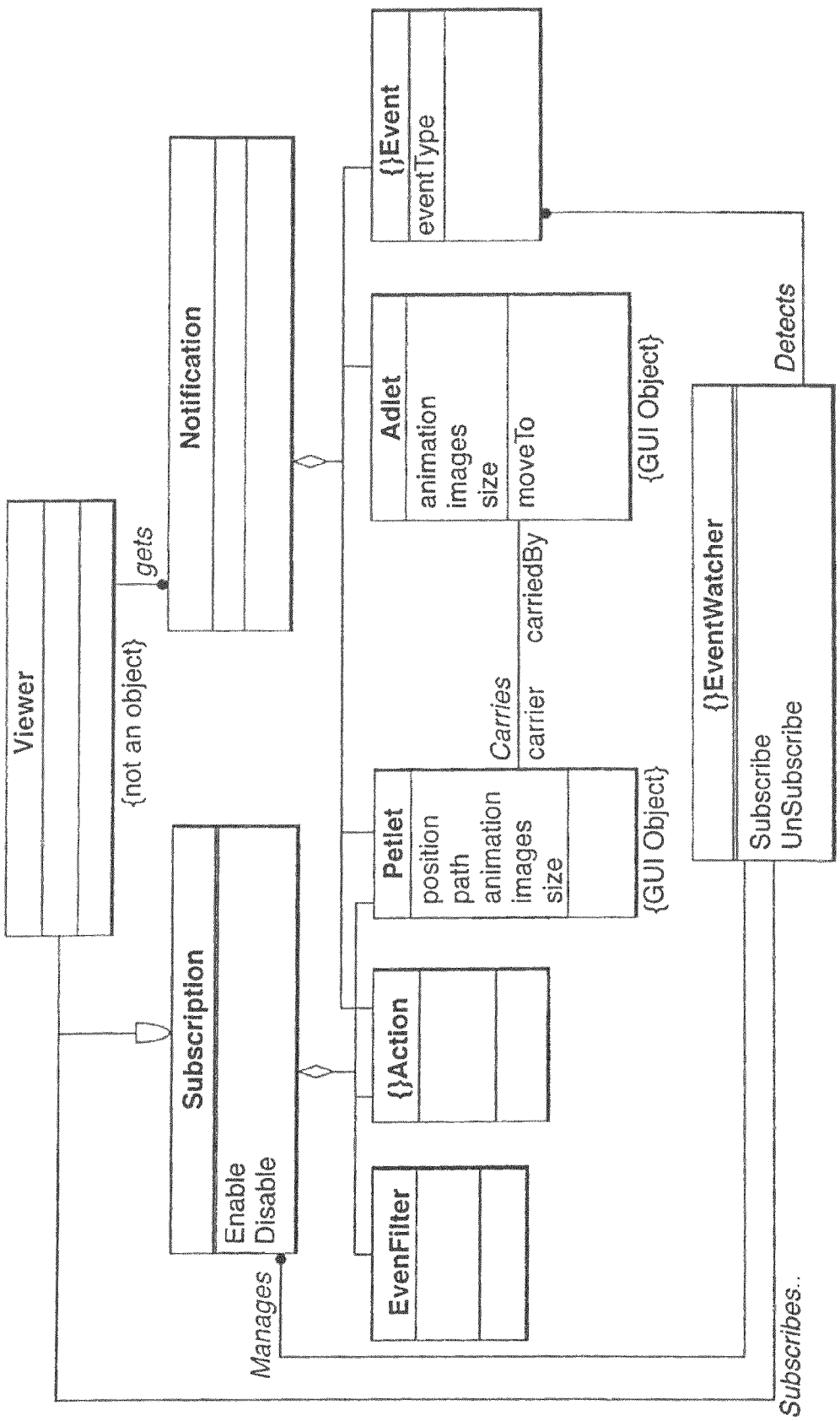
Figure 9:
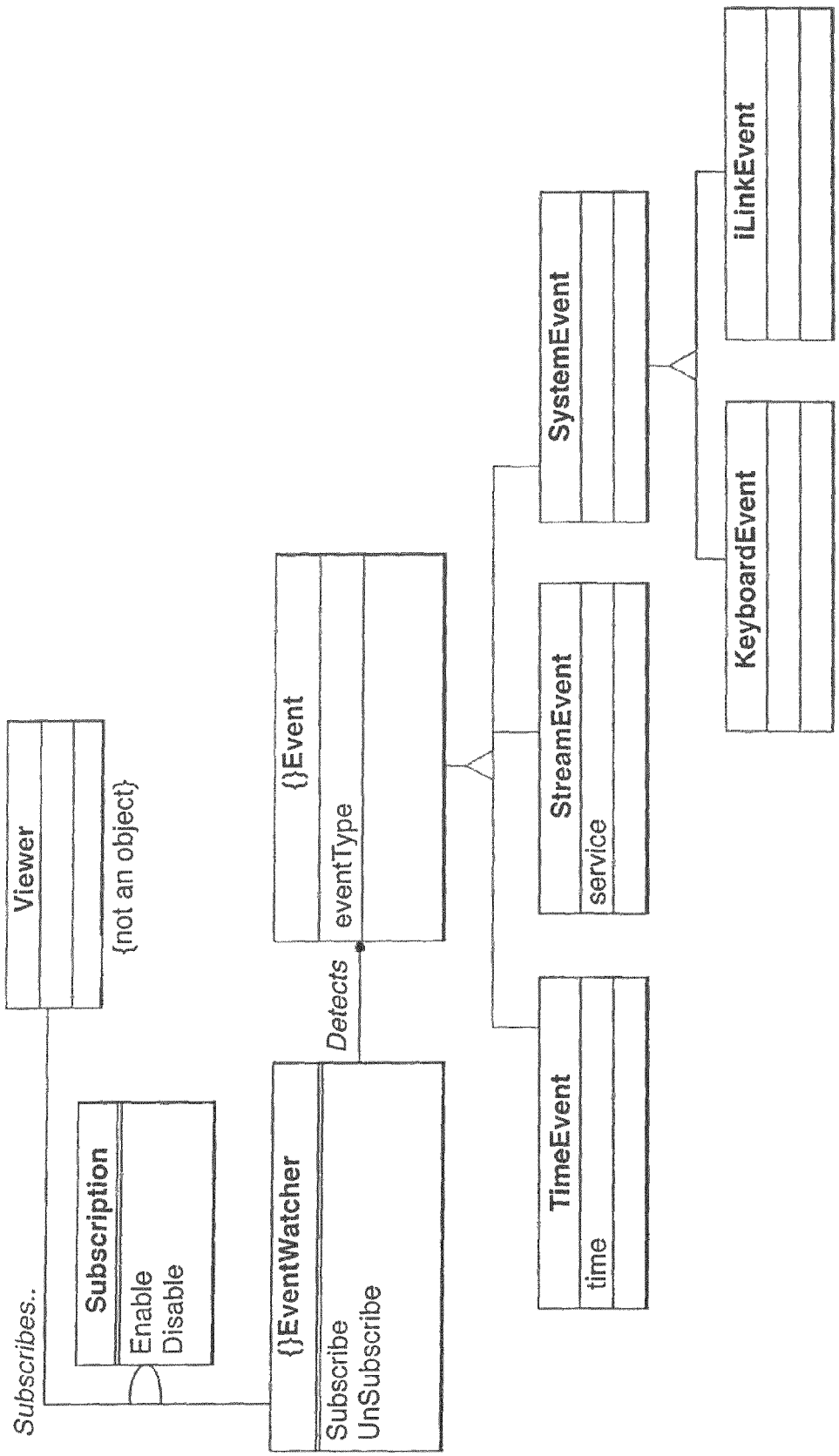
Figure 10:
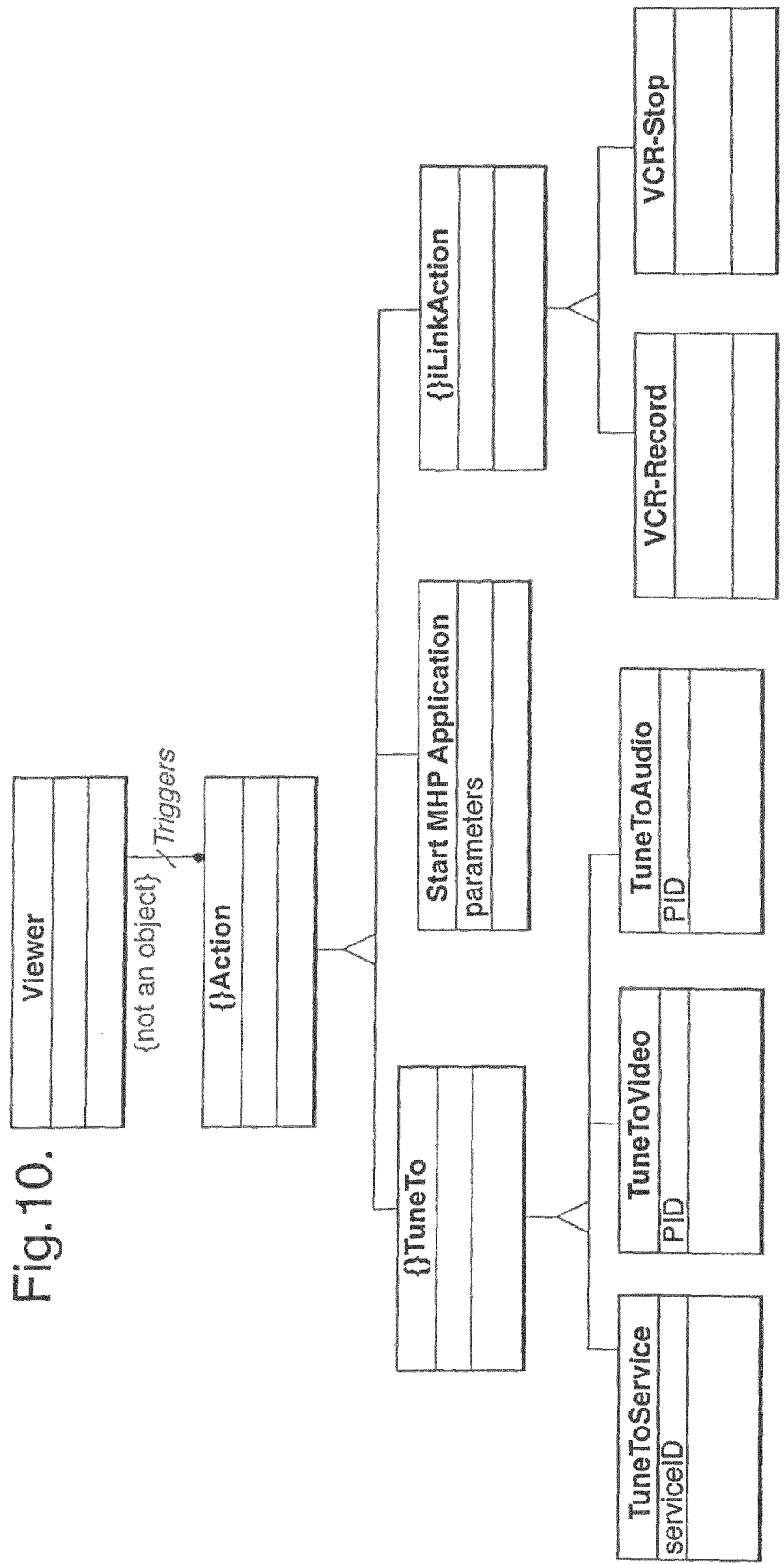
Figure 11:
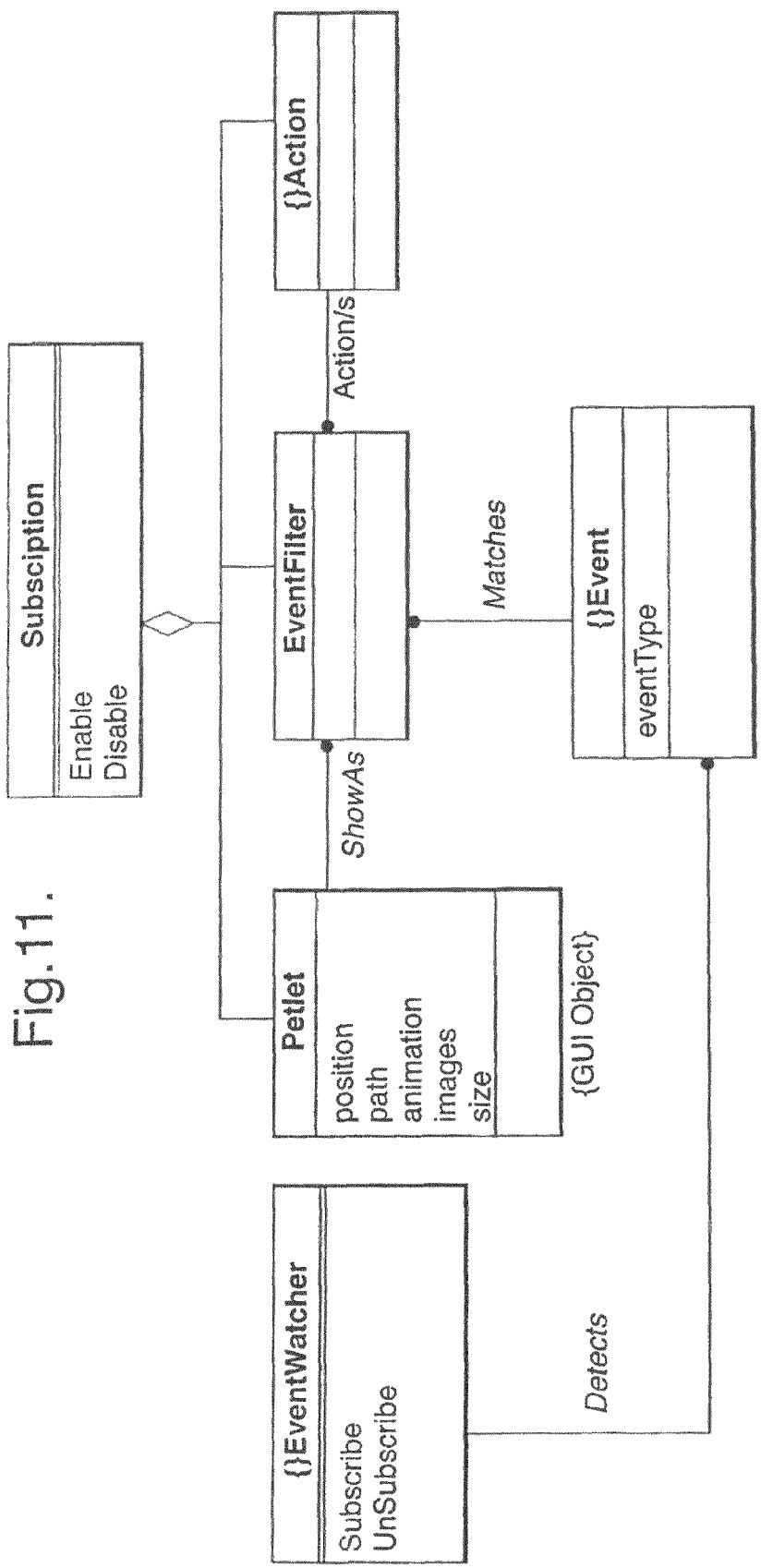
Figure 12:
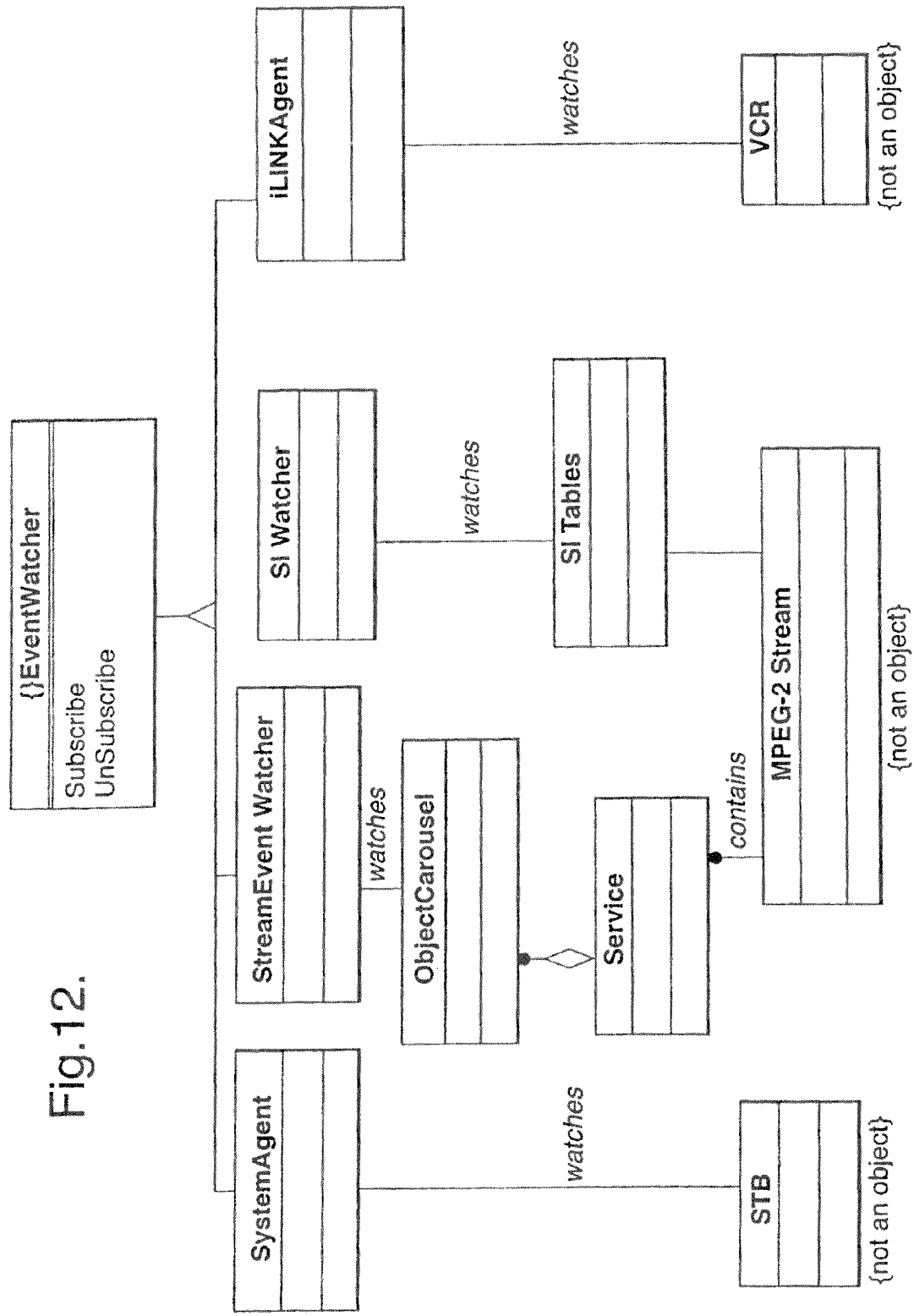
Figure 13:
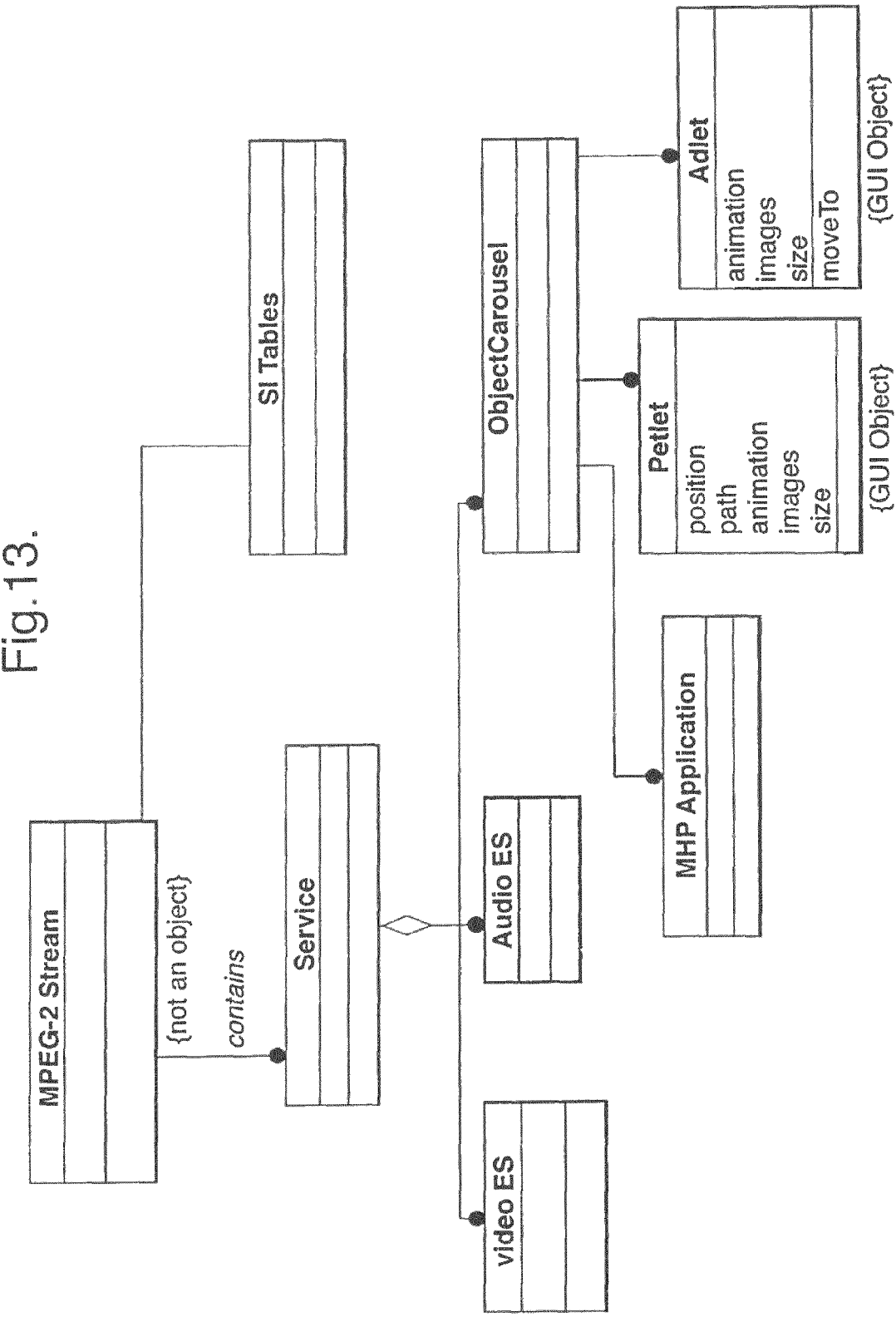

At all times the viewer may start a Java application to display all subscriptions, i.e. selected events. With this application, he can delete a subscription or change the associated control image. Both the viewer profiles and the list of subscriptions or selected events may be exported to and edited by another device (e.g. using the I-Link or a memory stick). The objects of the overall system are illustrated in FIG. 7. The objects for notification, events, aglets, selected events, event watchers and MPEG-2 streams are illustrated respectively in FIGS. 8 to 13 as ULL diagrams.

We claim:

1. A television display system for use with a television display for displaying television services and internet information, and an input unit that provides at least one command to the television display system, the television display system being configured to receive a data stream containing a plurality of key files, each key file including within the same key file executable data and a respective key image representing said executable data, the television display system including:

a memory that stores therein continuously over a predetermined period at least one of the key files;

a display section configured to display upon occurrence of any of a number of preselected events, the key image of the at least one of the plurality of key files stored in said memory, superposed on said television service being displayed, said key image upon activation executing said executable data included in the same key file to display content included in the same key file on the display section; and a command section configured to reproduce the content of the key file of the displayed respective image conditional upon a key command being provided by the input unit.

2. The television display system according to claim 1, further comprising:
a processor configured to receive information via the internet.

3. The television display system according to claim 2, wherein the display of the key image serves to indicate availability of access to further data.

4. The television display system according to claim 3, wherein the display section is further configured to display a control image included in a control image file, which also includes positioning data, and to superimpose the key image with the control image according to the positioning data determined from the control image file.

5. The television display system according claim 4, further comprising:
a detection section configured to detect an event corresponding to a network communication problem, wherein the display section is configured to, in response to the event corresponding to a network communication problem, display the control image.

6. The television display system according to claim 4, wherein the display section is further configured to display the key image for a predetermined period of time.

7. The television display system according to claim 1, wherein the display section is further configured to display the key image upon occurrence of any of the number of preselected events selected by a user.

8. The television display system according to claim 1, wherein the display section is further configured to display the key image upon occurrence of any of the number of preselected events selected by a broadcaster.

9. The television display system according to claim 1, wherein the display section is further configured to display the key image upon occurrence of any of the number of preselected events determined by the television display system.

10. The television display system according to claim 1, wherein the display section is further configured to display the key image upon occurrence of any of the number of preselected events, at least one of the preselected events being a stream event.

11. The television display system according to claim 1, wherein the television display system is configured to receive the key files from a broadcast carousel.

12. The television display system according to claim 1, wherein the display section is further configured to receive the content including audio/video from the memory on demand, upon execution of the executable data included in the key file.

13. The television display system according to claim 1, wherein the executable data includes audio and video data.

14. A hybrid television receiver internet terminal for use with a display for displaying television services and internet information, and an input that provides at least one command to the terminal, the terminal being configured to receive a data stream including a plurality of key files, each key file including within the same key file executable data and a respective key image representing said executable data, the terminal including:
a memory that stores therein continuously over a predetermined period at least one of the key files;
a processor configured to drive the display to display, upon occurrence of any of a number of preselected events, the key image of the at least one of the key files stored in said memory, superposed on said television service being displayed, said key image upon activation executing said executable data included in the same key file to display content included in the same key file on the display; and
a command section configured to reproduce the content of the key file of the displayed respective image conditional upon a key command being provided by the input unit.

15. A set-top box for use with a television display for displaying television services and internet information, and an input unit that provides at least one command to the set-top box, the set-top box being configured to receive a data stream containing a plurality of key files, each key file including within the same key file executable data and a respective key image representing said executable data, the set-top box including:
a memory that stores therein continuously over a predetermined period at least one of the key files;
a processor configured to drive the display to display, upon occurrence of any of a number of preselected events, the key image of the at least one of the key files stored in said memory, superposed on said television service being displayed, said key image upon activation executing said executable data included in the same key file to display content included in the same key file on the display; and
a command section configured to reproduce the content of the key file of the displayed respective image conditional upon a key command being provided by the input unit.

16. A broadcast system in combination with an internet server for providing, for reception by a television display system, a data stream containing a plurality of key files, each key file including within the same key file executable data and a respective key image representing said executable data wherein:
a memory of the television display system stores therein continuously at least one of the key files over a predetermined period,
a display section of the television display system displays, upon occurrence of any of a number of preselected events, a key image, and
a command section of the television display system executes upon a key command being provided by an input unit of the television display system, the executable data included in the same key file as the key image to display content included in the same key file on the display section.

17. The broadcast system according to claim 16, including a broadcast carousel for providing said data stream.

* * * * *